United States Patent [19]
Dettmar

[11] Patent Number: 6,119,840
[45] Date of Patent: Sep. 19, 2000

[54] TORSIONAL VIBRATION DAMPER

[75] Inventor: Martin Dettmar, Geldersheim, Germany

[73] Assignee: Mannesmann Sachs AG, Schweinfurt, Germany

[21] Appl. No.: 09/189,441

[22] Filed: Nov. 10, 1998

[30] Foreign Application Priority Data

Nov. 10, 1997 [DE] Germany .......................... 197 49 678

[51] Int. Cl.$^7$ .................................................. F16F 17/10
[52] U.S. Cl. ...................... 192/70.17; 74/574; 475/347; 464/3
[58] Field of Search ................................... 188/378, 379, 188/380; 192/3.21, 70.17, 48.3, 105 BA, 103 B; 74/574, 572; 475/346, 347; 464/1, 3

[56] References Cited

U.S. PATENT DOCUMENTS

| | | | |
|---|---|---|---|
| 4,800,996 | 1/1989 | Loizeau | 192/106.1 |
| 5,551,928 | 9/1996 | Sudau | 475/347 |
| 5,976,020 | 11/1999 | Lohaus et al. | 464/3 |

FOREIGN PATENT DOCUMENTS

| | | | | |
|---|---|---|---|---|
| 94 14 314 | 11/1994 | Germany | | F16D 13/60 |
| 2 285 109 | 6/1995 | United Kingdom | | F16F 15/134 |
| 2 290 597 | 1/1996 | United Kingdom | | F16F 15/131 |
| 2 297 820 | 8/1996 | United Kingdom | | F16F 15/131 |
| 2 310 911 | 9/1997 | United Kingdom | | F16F 15/134 |

Primary Examiner—Robert J. Oberleitner
Assistant Examiner—Pamela J. Lipka
Attorney, Agent, or Firm—Cohen, Pontani, Lieberman & Pavane

[57] ABSTRACT

A torsional vibration damper for arrangement in a drive train of an automobile comprises three flywheel mass arrangements arranged so as to be rotatable both jointly and relative to one another about a common first axis of rotation. At least two of the three flywheel mass arrangements are torsionally elastically coupled to one another by a spring arrangement. The three flywheel mass arrangements are coupled to one another via a roller gear. The first flywheel mass arrangement has a first toothing along at least a part circumference and the third flywheel mass arrangement has a second toothing along at least a part circumference. The second flywheel mass arrangement has at least one roller carrier mounted so as to be rotatable about a second axis of rotation and a plurality of roller bodies which roll on part regions of the first toothing and on part regions of the second toothing. Each roller body is arranged at a distance from the second axis of rotation and is mounted rotatably mounted on the roller carrier for rotating about a third axis of rotation assigned to the particular roller body.

35 Claims, 4 Drawing Sheets

TORSIONAL VIBRATION DAMPER

BACKGROUND OF THE INVENTION

1. Field of the Invention

The invention relates to a torsional vibration damper for installation in a drive train of an automobile.

2. Description of the Related Art

For damping torsional vibrations in the drive train of an automobile, German Utility Model 94 14 314 discloses a torsional vibration damper comprising three flywheel mass arrangements which are arranged so as to be rotatable both jointly and relative to one another about a common first axis of rotation and which are coupled to one another by a planetary gear for the transmission of torsional forces. Two of the three flywheel mass arrangements are coupled to one another in a torsionally elastic manner by a spring arrangement. The first flywheel mass arrangement has an external toothing and comprises a sun wheel. Planet wheels which are rotatably mounted about second axes of rotation offset axially parallel to the first axis of rotation on the second flywheel mass arrangement are in meshed engagement with the external toothing. The second flywheel mass arrangement acts as a planet wheel carrier. Furthermore, the planet wheels are also in meshed engagement with a ring gear formed by an internal toothing provided on the third flywheel mass arrangement.

In this torsional vibration damper, an input side of one of the three flywheel mass arrangements is fastened to the crankshaft of an internal combustion engine and an output side of another of the three flywheel mass arrangements carries a frictional surface of a friction clutch. When a change in the torque is transmitted from the input-side to the output-side, the two flywheel mass arrangements are rotatable relative to one another. Due to the torsionally elastic coupling of the input and output ones of the three flywheel mass arrangements, the torque fluctuation is damped and the torsional deflection of the input-side flywheel mass arrangement relative to the output-side flywheel mass arrangement assumes a value which is determined primarily by the torque to be transmitted and the spring force of the spring arrangement.

To operate the known torsional vibration damper, the first, second or third flywheel mass arrangement may selectively be used as the input-side flywheel mass and one of the two remaining flywheel mass arrangements as the output-side flywheel mass. Furthermore, the spring arrangement acts both between the input-side and the output-side flywheel mass arrangement and between the remaining third flywheel mass arrangement, also designated as an intermediate mass, and either the input-side flywheel mass or the output-side flywheel mass.

One disadvantage of the known torsional vibration damper is that, when a torque to be transmitted fluctuates only slightly around an average value, such as occurs when an automobile travels evenly at an essentially constant speed for relatively long periods of time, the relative rotary positions of the flywheel mass arrangements, coupled to one another via the planetary gear change over long periods of time. Although the amplitude of this change is low, it causes a constant back and forth movement around a middle position. The result of this slow back and forth motion is that, in each case, only individual teeth of the sun wheel, of the planet wheels and of the ring gear participate in transmitting the torques which are sometimes high. In comparison with other teeth of the planetary gear, therefore, these individual teeth undergo substantially increased wear which may lead to the destruction of individual teeth of the planetary gear and consequently limits the useful life of the vibration damper.

SUMMARY OF THE INVENTION

An object of the present invention is to provide a torsional vibration damper having a plurality of flywheel masses in which a gear arrangement coupling flywheel masses to one another is exposed to a low degree of wear.

The present invention includes a torsional vibration damper for arrangement in a drive train of an automobile and comprises three flywheel mass arrangements arranged so as to be rotatable both jointly and relative to one another about a common first axis of rotation. At least two of the three flywheel mass arrangements are coupled to one another in a torsionally elastic manner by a spring arrangement. A first of the three flywheel mass arrangements is coupled to a second of the three flywheel mass arrangements and the second flywheel mass arrangement is coupled to a third of the three flywheel mass arrangements by a gear arrangement. The gear arrangement comprises a first toothing on a portion of a circumference of the first flywheel mass arrangement, a second toothing on a portion of a circumference of the third flywheel mass arrangement, and a torsion transmission device mounted on the second flywheel mass arrangement so as to be rotatable about a second axis of rotation and which engages the first toothing and the second toothing for transmitting the torsional forces.

According to the invention, in such a torsional vibration damper, the torsion transmission device comprises at least one roller carrier mounted on the second flywheel mass arrangement so as to be rotatable about the second axis of rotation. The at least one roller carrier includes a plurality of roller bodies. Each of the plurality of roller bodies is rotatably mounted for rotation about a separate axis of rotation at a distance from the second axis of rotation. The plurality of roller bodies roll at least on part regions of the first toothing and on part regions of the second toothing for transmitting torsional forces.

The invention is based on the finding that, in the torsional vibration damper initially described, in which intermeshing gearwheels couple the three flywheel mass arrangements to one another, the tooth flanks of two gearwheels engage one in the other with frictional contact. The frictional contact of individual tooth flanks one on the other, which takes place under possibly high load and with constant back and forth movements, leads to the premature wear of said tooth flanks.

The invention is based on the notion that this type of wear which occurs locally on the gear is reduced if a torsion transmission device including rotatably mounted roller bodies are used instead of intermeshing gearwheels for transmitting the torques. Although the roller bodies engage a toothing for the transmission of torques, they roll on this toothing. The rolling friction occurring between the individual elements of the gear arrangement cause comparatively low wear.

The portion of the circumference along which the first and/or second toothing is provided on the first or third flywheel mass arrangement respectively, is advantageously selected to be large enough so that the torsion transmission device rolls with its roller bodies along the entire rotational travel permitted by the torsionally elastic coupling between the two flywheel mass arrangements.

Advantageous geometries for toothing shapes, on which the roller bodies roll to transmit torsional forces may be calculated with the aid of numeric methods and manufactured by means of NC tools or stamping tools.

The geometry of the toothing may be selected such that the first flywheel mass arrangement has rotational play in relation to the second flywheel mass arrangement. This may be exhibited by the fact that, when the second flywheel mass arrangement is in a fixed rotary position relative to the third flywheel mass arrangement and the roller carrier is in a fixed rotary position relative to the second flywheel mass arrangement, the first flywheel mass arrangement can be moved back and forth over a rotary angle range, the rotary angle range being restricted by the bearing of roller bodies on the first toothing. Correspondingly, the geometry of the second toothing may be designed in such a way that the third flywheel mass arrangement has rotational play in relation to the second flywheel mass arrangement. Rotational play of this kind may be utilized to reduce the wear of the gear arrangement even further, specifically in that torsional vibrations which occur are absorbed in the rotational play, without driving the remaining components of the gear arrangement.

During the transmission of torques, at least one roller body bears on a tooth flank of the first or second flywheel mass arrangement. This bearing of the roller body will be maintained, due to the torsionally elastic action of the spring arrangement at the tooth flank, even in the event of slight fluctuations of the torque to be transmitted. In the operating state described, therefore, this available rotational play is not used up, and adverse effects, such as increased noise generation, which possibly arise with rotational play, do not occur in this case. Toothings with rotational play can be manufactured more simply than toothings without rotational play.

There may also be provision for designing the first or the second toothing and the roller bodies engaging into them such that the first and third flywheel mass arrangement have essentially no rotational play in relation to the second flywheel mass arrangement, thus leading to particularly quiet running of the gear arrangement.

A plurality of torsion transmission devices are distributed circumferentially around the first axis of rotation in the preferred embodiment. The plurality of torsion transmission devices, as compared with only a single torsion transmission device, reduces the torque to be transmitted by each individual torsion transmission device, thus has a wear-decreasing effect and reduces the radial forces occurring between the three flywheel mass arrangements.

With a given toothing geometry, the use of a plurality of torsion transmission devices reduces the rotational play occurring between the flywheel mass arrangements in that the rotational play in a first direction of rotation is restricted by the bearing of a roller body of a first of the plurality of torsion transmission devices on the first or second toothing and the rotational play in a second direction of rotation opposite to the first direction of rotation is restricted by the bearing of a roller body of a second torsion transmission device, different from the first torsion transmission device, on the first or second toothing. Particularly quiet running of the gear arrangement may also be achieved by this measure.

To best compensate the radial forces exerted on the three flywheel mass arrangements by the torsion transmission devices, the torsion transmission devices are advantageously arranged substantially uniformly about the axis of rotation. To that end, an even number of torsion transmission devices are located diametrically opposite one another in pairs with respect to the first axis of rotation.

To further optimize the geometry of the toothing in the case of torsion transmission devices distributed essentially uniformly around the first axis of rotation, the first and the second toothing are symmetrical with respect to rotation through an angle that equals a multiple of 360° divided by the number of torsion transmission devices. For example, if six torsion transmission devices are arranged at an angle of 60° to one another about the first axis of rotation, the toothing is designed symmetrically with respect to rotation trough 60°. Consequently, each of the torsion transmission devices together with their roller bodies is in the same rotary position relative to the toothing and there is therefore an essentially uniform load apportionment between the individual torsion transmission devices. If the toothing is designed symmetrically with respect to rotation through 180°, then, when torsion transmission devices are located diametrically opposite one another in each case, substantially identical tooth engagement conditions are present. Moreover, at the same time, the toothing may also be designed such that different tooth engagement conditions prevail in each case between different pairs of torsion transmission devices located diametrically opposite one another, this being conducive to quiet running of the gear arrangement.

During the rotation of the at least one torsion transmission device about the second axis of rotation, circumferentially successive roller bodies of the torsion transmission device engage in turn into mutually adjacent tooth spaces of the first toothing or the second toothing. This ensures that only one roller body engages into a tooth space at any moment and the roller body which is next in the circumferential direction engages into a tooth space adjacent to this tooth space beyond a tooth tip. The geometry of the rollers and toothings may also be designed such that a plurality of rollers of a torsion transmission device engage simultaneously into a tooth space.

The first toothing may also have a tooth pitch which is different from the tooth pitch of the second toothing. This affords a possibility, in the case of given toothing radii, to adjust the transmission ratio of the gear arrangement.

Furthermore, there may be provision for the first and the second toothing to have an essentially uniform tooth pitch, the result of this being that the transmission ratio from the first to the second or from the second to the third flywheel mass arrangement is essentially independent of the rotary positions of the flywheel mass arrangements in relation to one another.

A transmission ratio which changes with the rotational deflection of the flywheel mass arrangements in relation to one another may advantageously be achieved if the first and the second toothing have a nonuniform tooth pitch.

This nonuniform tooth pitch may advantageously be employed when the rotational deflection of the two torsionally elastically coupled flywheel mass arrangements is limited between maximum rotational deflection positions. During rotations between these maximum rotational deflection positions, the roller bodies of the at least one torsional transmission device roll over a predetermined region of the first or second toothing. Within this region, the first or second toothing is designed such that the tooth pitch increases or decreases from essentially the middle of this region toward its two ends. It is thereby possible for the profile of the restoring force exerted by the torsionally elastic coupling between the two flywheel mass arrangements to be adjusted, as a function of the rotational deflection, to a desired characteristic line. In a preferred embodiment, the characteristic line of the restoring force increases progressively toward the maximum rotational deflection positions.

In a further embodiment, the first and the second toothing have at least one tooth tip with two directly adjacent tooth flanks which are designed asymmetrically with respect to an axis running through the tooth tip and the axis of rotation. The toothing can be optimized in a controlled manner by providing damping properties for torsional fluctuations acting clockwise that are different from the damping properties provided for the damping of torque fluctuations acting counterclockwise.

Although the roller bodies may be mounted on the roller carrier by any desired bearings, sliding bearings are preferably provided here, which have good wear resistance under high load, even during only slight back and forth movements. Sliding bearings are likewise preferably used in the mounting of the roller carrier on the second flywheel mass arrangement. However, here too, any desired bearings and such, for example, as rolling bearings may be provided.

In a further embodiment, the first toothing on the first flywheel mass arrangement is designed as an external toothing and the second toothing on the third flywheel mass arrangement is designed as an internal toothing. In this arrangement, the gear arrangement requires a particularly small amount of axial space.

In this embodiment, it is further preferred that the external toothing and the internal toothing lie in essentially one plane and that the first axis of rotation, the second axis of rotation and the third axis of rotation are substantially parallel to one another. Particularly low forces in the axial direction occur in this gear arrangement.

Instead of designing the first toothing as an external toothing and the second toothing as an internal toothing, both toothings may be designed as external toothings or both toothings may be designed as internal toothings. In both cases the three axes of rotation are oriented essentially parallel to one another. On the other hand, the second axis of rotation may be oriented obliquely and even perpendicularly to the first axis of rotation.

When the first toothing is designed as an external toothing and the second toothing as an internal toothing, it is particularly preferred that the second flywheel mass arrangement supporting the torsion transmission device is mounted relative to the first flywheel mass arrangement by a rotary bearing such, for example, as a rolling bearing or a sliding bearing. The rotary bearing arrangement achieves quiet running of the gear arrangement. However, in specific instances of use, it may even be sufficient for the second flywheel mass arrangement to be mounted in relation to the first flywheel mass arrangement solely as a result of the centering effect of a plurality of torsion transmission devices distributed around the first axis of rotation. Furthermore, the third flywheel mass arrangement may also be mounted relative to the second or first flywheel mass arrangement by a rotary bearing. The three flywheel mass arrangements may also be mounted relative to one another solely as a result of the effect of a plurality of torsion transmission devices distributed around the first axis of rotation.

With a view to a compact and stable design, another embodiment includes the second flywheel mass arrangement with a U-shaped structure which opens radially inward and at least partially surrounds a radially outer side of the third flywheel mass arrangement. In this embodiment, the torsion transmission device is mounted on leg portions of the U-shaped structure.

It is also preferred that the spring arrangement of the torsionally elastic coupling of the third flywheel mass arrangement, provided with the internal toothing, and the second flywheel mass arrangement supporting the torsion transmission device, is surrounded by the U-shaped structure radially from the outside. This results in a particularly compact design.

This U-shaped structure preferably comprises a chamber sealed off in the radially outward direction for receiving lubricant such, for example, as a pasty lubricant. At least one of the internal toothing, the at least one torsion transmission device, the external toothing, and the spring arrangement is arranged in the chamber. The lubricant ensures lubrication of the elements arranged in this chamber. Even if the chamber is not filled with lubricant completely, the rolling movement of the roller bodies on the internal toothing distributes the lubricant within the chamber. Furthermore, the lubricant also supplies viscosity friction force which may brake movement of the third flywheel mass arrangement in relation to the second flywheel mass arrangement and thus contributes to damping torsional vibrations.

In a preferred embodiment, the second flywheel mass arrangement which supports the at least one torsion transmission device is an output-side flywheel mass and comprises a clutch friction surface of a friction clutch. The clutch friction lining bears on the friction surface when the clutch is in a coupled state. The clutch friction surface is provided on an annular disk flywheel which is fixedly connected in terms of rotation to the U-shaped structure and is arranged axially adjacent to the U-shaped structure. To avoid soiling the clutch friction surface with lubricants, a lubricant seal is provided between the U-leg axially facing the clutch friction surface and the first flywheel mass arrangement.

The rotary bearing which supports the second flywheel mass arrangement in relation to the first flywheel mass arrangement includes a lubricant seal to simultaneously seal off the rotary bearing at the same time.

To simplify manufacture, the two U-legs are preferably formed by two sheet metal forms running substantially radially relative to the first axis of rotation.

The annular disk flywheel described above is connected by riveting to one of these two sheet metal forms. The radially outward portion of the other of these two sheet metal forms is bent toward the first sheet metal form. This forms the U-bend of the U-shaped structure. The axial end of the second sheet metal form facing the first sheet metal form is welded to the first sheet metal form.

For simple mounting of the roller carrier on the second flywheel mass arrangement by means of a sliding bearing, a first rivet which is centered substantially relative to the second axis of rotation passes through the two U-legs and is surrounded by a first sliding bearing sleeve between the two U-legs.

As regards an axial fixing of the sliding bearing sleeve, there is preferably provision for the latter to bear with its axial ends on the two U-legs. This keeps the two U-legs at a specific distance from one another.

The roller carrier preferably has a tubular portion which is mounted on the first sliding bearing sleeve. To mount the roller bodies on the roller carrier with sliding bearings, the axial ends of the tubular portion have adjoining them two annular disk parts which extend radially and substantially parallel to the U-legs. A plurality of second rivets pass through the two annular disk parts. The second rivets are in each case centered essentially relative to one of the third axes of rotation and which are in each case surrounded by a second sliding bearing sleeve between the two disk parts. A roller body then runs on each of these sliding bearing sleeves.

To fix the sliding bearing sleeves in the axial direction and also to keep the two disk parts at a distance from one another, the second sliding bearing sleeves bear with their axial ends on the two disk parts.

To implement the torsionally elastic coupling of the second flywheel mass arrangement to the third flywheel mass arrangement within the U-shaped structure, the spring arrangement comprises a plurality of compression springs oriented in the circumferential direction and which are arranged in recesses of the third flywheel mass arrangement. The recesses are provided radially outside the internal toothing. The compression springs are then preferably actuated by the second flywheel mass arrangement by at least one activating element riveted to one of the two U-legs.

The third flywheel mass arrangement is guided relative to the second flywheel mass arrangement by a sliding element to improve the radial guidance of the third flywheel mass arrangement. The sliding element is preferably a plastic sliding element.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
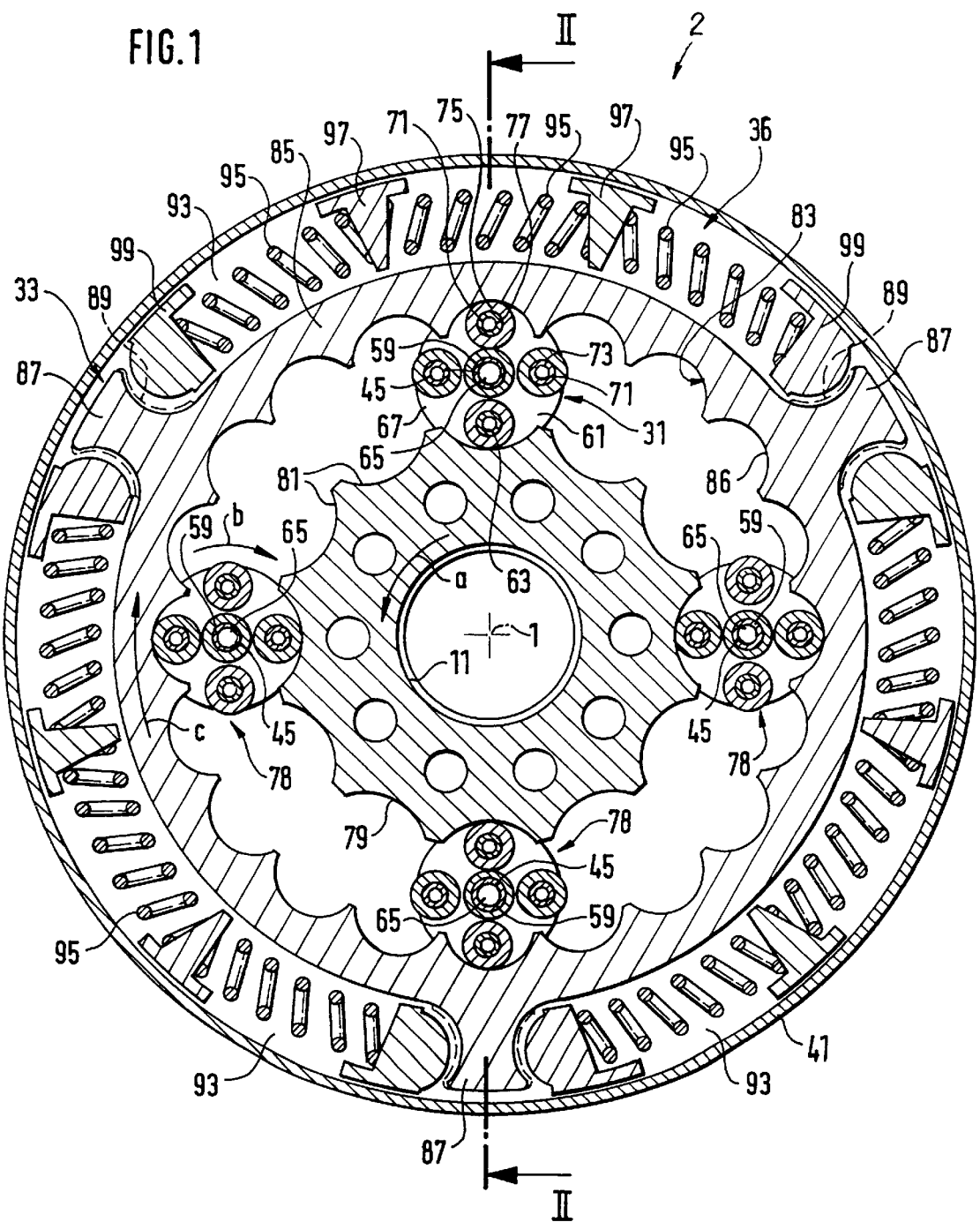
FIG. 1 is an axial cross sectional view showing a torsional vibration damper according to an embodiment of the present invention along a line I—I in FIG. 2.
Figure 2:
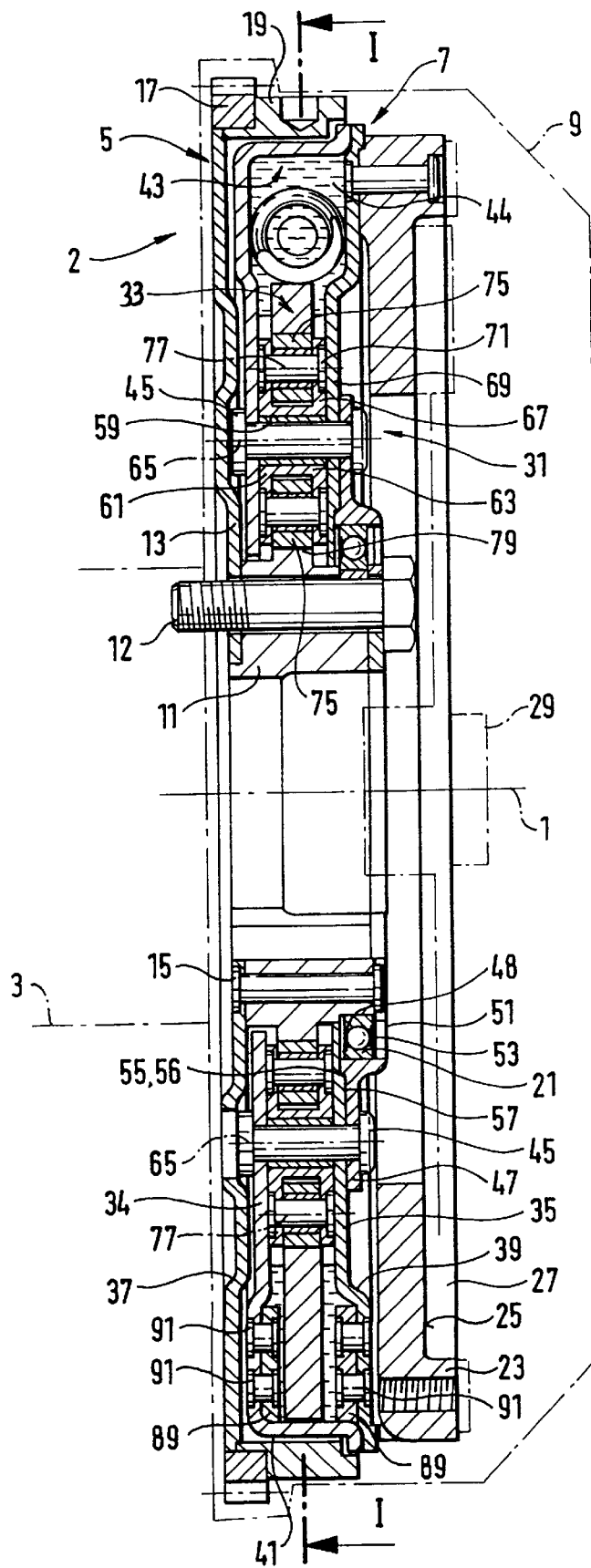
FIG. 2 shows an axial longitudinal section through the torsional vibration damper of FIG. 1 along a line II—II in FIG. 1.

FIGS. 1 and 2 show sectional views of an embodiment of a torsional vibration damper 2 according to the present invention. The torsional vibration damper 2 is rotatable about an axis of rotation 1 and includes an input-side flywheel mass arrangement 5 connected to a crankshaft 3 and an output-side flywheel mass arrangement 7 which is arranged in a clutch housing 9 (the crankshaft 3 and clutch housing 9 are illustrated by dashed lines in FIG. 2). The input-side flywheel mass arrangement 5 comprises a central hub part 11 fastened to the crankshaft 3 by a plurality of circumferentially distributed screws 12 and an annular sheet metal form 13 extending essentially radially relative to the first axis of rotation 1. The radially inner circumference of the annular sheet metal form 13 is fastened to a side of the central hub part 11 axially facing the crankshaft 3 by a plurality of circumferentially distributed rivets 15. A starter gear ring 17 and a solid ring flywheel 19 are fixedly connected with respect to rotation to an outer circumference of the annular sheet metal form 13. The solid ring flywheel 19 increases the flywheel mass of the input-side flywheel mass arrangement 5.

A ball bearing 21 is mounted on an outer circumference of the central hub part 11 on a side facing axially away from the crankshaft 3. The output-side flywheel mass arrangement 7 is guided axially and radially by the ball bearing 21 relative to the input-side flywheel mass arrangement 5 so as to be rotatable about the axis of rotation 1. Furthermore, a ring flywheel 23 is mounted fixedly in terms of rotation on the output-side flywheel mass arrangement 7 with a friction surface 25 for bearing on a clutch lining 27 (the clutch lining 27 together with its hub part 29 are connected to a gear input shaft as illustrated by dashed lines in FIG. 2).

To transmit torques and damp torque fluctuations, the output-side flywheel mass arrangement 7 is coupled via a roller gear 31 to the input-side flywheel mass arrangement 5 and to an intermediate flywheel mass arrangement 33. Furthermore, the output-side flywheel mass arrangement 7 is coupled in a torsionally elastic manner to the intermediate flywheel mass arrangement 33 by a spring arrangement 36.

The output-side flywheel mass arrangement 7 includes a carrying structure that is essentially U-shaped having two annular radially oriented sheet metal forms 34, 35 which extend radially as shown in FIG. 2. The two annular radially oriented sheet metal forms 34, 35 are in each case connected to the central hub part 11 proximate the outer circumference of the central hub part 11 of the input-side flywheel mass arrangement 5. The two sheet metal forms 34, 35 extend radially at a distance from one another from the inside essentially in a straight line radially outward. Each of the sheet metal forms 34, 35 has an annular step 37, 39 to increase the axial distance between them in the radially outer region. Near its radially outer end, the sheet metal form 34 facing the crankshaft 3 is bent toward the other sheet metal form 35 forming an axially running portion 41 of the sheet metal form 34. An axial end of the axially running portion 41 facing away from the crank shaft 3 is welded to the sheet metal form 35. Thus, an annular chamber 43 is formed around the central hub part 11 by the two sheet metal forms 34, 35. The weld seam between the sheet metal forms 34, 35 is designed to be lubricant-tight, so that a pasty lubricant 44 introduced into the annular chamber 43 for operating the torsional vibration damper is held in the chamber during a rotation about the axis of rotation 1, even under the effect of centrifugal forces.

In a radially central region of the annular chamber 43, four rivets 45 are distributed uniformly in the circumferential direction at the same radial distance from the first axis of rotation 1 and extend through the two sheet metal forms 34, 35 in parallel with the first axis of rotation 1. A bearing holder 47 is fastened to the sheet metal form 35 by these rivets 45. The bearing holder 47 and the sheet metal form 35 fix the ball bearing 21 which supports the output-side flywheel mass arrangement 7 in relation to the input-side flywheel mass arrangement 5. For this purpose, the bearing holder 47 extends radially inward from the region of the rivets 45 and forms a cylindrical inner circumferential region on which the outer circumference of the ball bearing 21 carried by the central hub part 11 bears. The bearing 21 is also positioned axially between the radially inner end of the sheet metal form 35 and a portion 51 of the bearing holder 47 that extends radially inward. To guide the output-side flywheel mass arrangement 7 in the axial direction, a lubricant seal 48 is inserted between the ball bearing 21 and the radially inner portion of the sheet metal form 35 on that side of the ball bearing 21 which faces the crankshaft and another lubricant seal 53 is inserted between the ball bearing 21 and the portion 51 of the bearing holder 47 on that side of the ball bearing 21 which faces away from the crankshaft 3. For centering the bearing holder 47 in relation to the sheet metal form 35, annular steps 55 and 56 are provided on both of these and in each case bear one on the other. In addition, a sealing ring 57 is provided between the bearing holder 47 and the sheet metal form 35 to seal off lubricant which may emerge from the ball bearing 21. The lubricant seals 48, 53 and sealing ring 57 also prevent the pasty lubricant 44 contained in the annular chamber 43 from flowing toward the friction surface 25.

A bearing sleeve 59 surrounds the outer circumference of each of the rivets 45 in the region between the sheet metal forms 34 and 35. The two axial ends of the bearing sleeve 59 bear on the sheet metal forms 34 and 35. The bearing sleeves 59 hold the sheet metal forms 34 and 35 at a distance from one another in their radially inner region with respect to the tension force of the rivets 45.

Each of the bearing sleeves 59 is a sliding bearing for receiving a tubular portion 63 of the roller carriers 61 with an inner circumference bearing on the outer circumference of the bearing sleeve 59. The roller carriers 61 are thus rotatable about the bearing sleeve 59 about a second axis of rotation 65 running centrally through the rivets 45 and parallel to the first axis of rotation 1. To minimize friction generated between the roller carrier 61 and the sheet metal forms 34, 35, the tubular portions 63 are at least slightly shorter than the length of the bearing sleeves 59. At each axial end of a tubular portion 63, an annular disk part 67, 69, respectively, extends radially outward relative to the second axis of rotation 65. Four rivets 71 pass through the two disk parts 67, 69 which are oriented parallel to the second axis of rotation 65 and are arranged in each case at the same distance from the second axis of rotation 65 and distributed uniformly around it. A sliding bearing sleeve 73 is mounted on an outer circumference of each rivet 71 between the two disk parts 67, 69. The axial ends of the sliding bearing sleeve 73 bear on the disk parts 67, 69 and keep them at a specific distance from one another. Each sleeve 73 is a sliding bearing for a roller 75 which is rotatable about the sliding bearing sleeve 73 and consequently about third axes of rotation 77 running through the rivets 71 and parallel to the first axis of rotation 1 and to the second axis of rotation 65.

The output-side flywheel mass arrangement 7 that is rotatable about the first axis of rotation 1 carries roller carriers 61 which are rotatable about four second axes of rotation 65 which extend a distance from and parallel to the first axis of rotation 1. Each of the roller carriers 61 carries four rollers 75 that are rotatable about third axes of rotation 77 at a distance from and parallel to the second axis of rotation 65. Each roller carrier 61 with its rollers 75 forms a torsion transmission device 78 which transmits torsional forces from the input-side flywheel mass arrangement 5 to the output-side flywheel mass arrangement 7 and to the intermediate flywheel mass arrangement 33. For this purpose, an outer circumference of the central hub part 11 has an external toothing 79 on which the rollers 75 may roll. The external toothing 79 is designed such that during rotation on the input-side flywheel mass arrangement 5 relative to the output-side flywheel mass arrangement 7 about the first axis of rotation 1, each roller carrier 61 rotates about the second axis of rotation 65 and rollers 75, succeeding one another in the circumferential direction about the second axis of rotation 65, engage in turn into mutually adjacent tooth spaces 81 of the external toothing 79.

The intermediate flywheel mass arrangement 33 comprises a substantially annular body 85 having an inner circumference with an internal toothing 83 on which the rollers 75 likewise roll. The internal toothing 83 is designed such that, during rotation of the intermediate flywheel mass 33 relative to the output-side flywheel mass 7 about the first axis of rotation 1, each roller carrier 61 rotates about its second axis of rotation 65 and rollers 75, succeeding one another in the circumferential direction about the second axis of rotation 65, engage in turn into mutually adjacent tooth spaces 86 of the internal toothing 83.

Thus, when the output-side flywheel mass arrangement 7 is retained and the input-side flywheel mass arrangement 5 is rotated about the first axis of rotation 1 in a direction of rotation indicated by an arrow a in FIG. 1, each roller carrier 61 rotates in a direction of rotation indicated by an arrow b in FIG. 1. This rotates the intermediate flywheel mass arrangement 33 in a direction indicated by an arrow c in FIG. 1 and which is opposite to the direction of rotation a of the input-side flywheel mass arrangement 5.

On the annular body 85 of the intermediate flywheel mass arrangement 33, three arms 87 are distributed uniformly about the first axis of rotation 1 and project radially outward proximate the axially running portion 41 of the sheet metal form 34. Three control plates 89 are distributed uniformly about the first axis of rotation 1 and fastened to those sides of the sheet metal forms 34, 35 by rivets 91 which are located in the annular chamber 43 radially outside the annular steps 37, 39. The control plates 89 are identical in contour to the arms 87 of the annular body 85 and which cover these arms, as seen in the axial direction, when the intermediate flywheel mass arrangement 33 is in a basic rotary rest position relative to the output flywheel mass arrangement 7 (see FIG. 1). The control plates 89 and arms 87 delimit the circumferential ends of three chambers 93. The chambers are radially inwardly delimited by the outer circumference of the annular body 85 and radially outwardly delimited by the axially running portion 41 of the sheet metal form 34. Arranged in each chamber 93 is a spring arrangement 36 including three helical compression springs 95 which are circumferentially oriented about the first axis of rotation 1. Plastic sliding pieces 97 are arranged between adjacent helical compression springs 95 in each chamber which are slidably displaceable on the inner circumference of the axially running portion 41 of the sheet metal form 34. The helical compression springs 95 adjacent to the arms 87 are supported via plastic spring saddles 99 on the arms 87 or the control plates 89. Moreover, the spring saddles 99 support the annular body 85 radially outward in relation to the axially running portion 41 of the sheet metal form 34 and additionally contribute to centering the annular body 85 about the axis of rotation 1. However, the radial forces necessary for centering the annular body 85 are exerted essentially as a result of the centering action of the roller gear 31. During rotation of the intermediate flywheel mass arrangement 33 in relation to the output-side flywheel mass arrangement 7 about the first axis of rotation 1, the helical compression springs 95 (illustrated in their rest position in FIG. 1) are compressed between an arm 87 and the pair of control plates 89 following in the circumferential direction, with the result that the two flywheel mass arrangements 7, 33 are coupled to one another in a torsionally elastic manner.

Thus, as a result of the action of the spring arrangement 36, when no torque is applied to the torsional vibration damper 2 the intermediate flywheel mass arrangement 33 and the output-side flywheel mass arrangement 7 are held in the basic rotary rest position relative to one another, as shown in FIG. 1. Furthermore, since the input-side flywheel mass arrangement 5 is torsionally coupled to the two remaining flywheel mass arrangements 7, 33 via the roller gear 31, this flywheel mass arrangement 5, is also held in a basic rotary rest position in relation to the other two flywheel mass arrangements 7, 33. When a torque is applied between the input-side flywheel mass arrangement 5 and the output-side flywheel mass arrangement 7, they rotate relative to one another, the torsion transmission devices 78 in each case being set in rotation about the second axis of rotation 65 and the intermediate flywheel mass arrangement 33 being set in rotation about the first axis of rotation 1 and the helical compression springs 95 being compressed. Thus, torque fluctuations to be transmitted from the input-side flywheel mass arrangement 5 to the output-side flywheel mass arrangement 7 are damped. Friction also contributes to this damping. The friction occurs between the individual flywheel mass arrangements 5, 7, 33, such as, for example, sliding friction between the sliding pieces 97 and the axially running portion 41 of the sheet metal form 34 or viscosity friction which is generated during the compression of the helical compression springs 95 and the rotation of the annular body 85 and of the torsion transmission devices 78 in the pasty lubricant 44 with which the annular chamber 43 is filled.

In FIG. 1 the external toothing 79 and the internal toothing 83 are depicted having a uniform tooth pitch over their outer circumference with the tooth pitch of the external toothing 79 being greater than the tooth pitch of the internal toothing 83. Since the tooth pitch of the external toothing 79 is greater than the tooth pitch of the internal toothing 83, a lower rotational speed of the annular body 85 is achieved during rotation of the input-side flywheel mass arrangement 5 in relation to the output-side flywheel mass arrangement 7 than that which would occur if both toothings 79, 83 were identical. As a result of the restricted rotatability of the annular body 85 in relation to the output-side flywheel mass arrangement 7 which is predetermined by the spring arrangement 35, a greater possible range of rotation of the input-side flywheel mass arrangement 5 in relation to the output-side flywheel mass arrangement 7 is achieved. This enlarged range of rotation may be fully utilized for damping torque fluctuations.

Variants of the torsional vibration damper 2 illustrated in FIGS. 1 and 2 are explained below. Similar components corresponding to one another in terms of design and function are designated by the reference numerals from FIGS. 1 and 2, but are given a letter in order to distinguish them. For explanatory purposes, reference is made to the whole of the preceding description.

Figure 3:
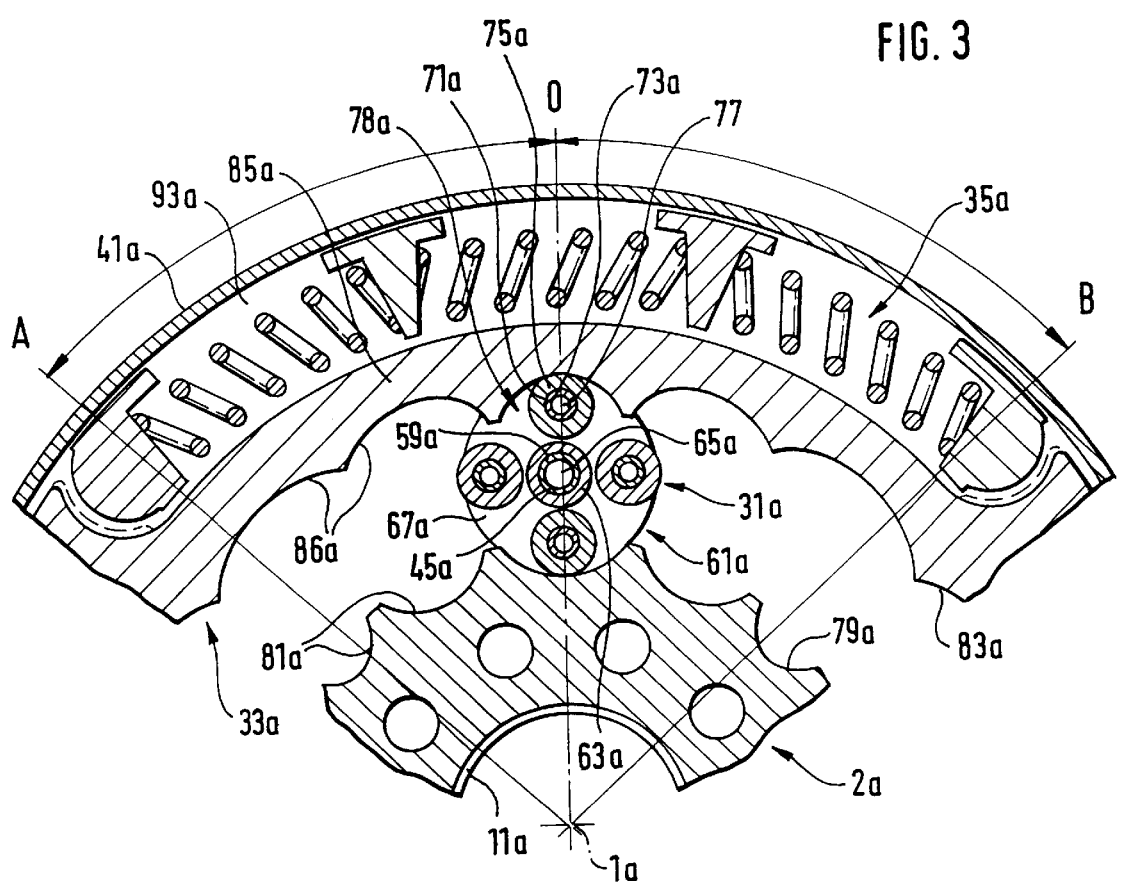
FIG. 3 is a partial axial cross sectional view of another embodiment of the torsional vibration damper of FIG. 1.

The torsional vibration damper 2a illustrated in FIG. 3 differs from the torsional vibration damper 2 illustrated in FIGS. 1 and 2 essentially in that the external toothing 79a of the central hub part 11a of the input-side flywheel mass arrangement 5 and the internal toothing 83a of the annular body 85a of the intermediate flywheel mass arrangement 33 have tooth pitches which are nonuniform in the circumferential direction. Only a circumferential segment of the two toothings 79a, 83a are illustrated in FIG. 3. The circumferential segments of the toothings 79a, 83a that are not illustrated run in a similar way to the circumferential segment illustrated. In FIG. 3, the flywheel mass arrangements are in each case illustrated in their basic rotary positions. In the basic rotary positions, the second axis of rotation 65a assumes a circumferential position designated by 0. The rotational travel of the intermediate flywheel mass arrangement 33a relative to the output-side flywheel mass arrangement 7 is limited on both sides of the basic rotary position to maximum rotational deflection positions designated by A and B as a result of the maximum compression of the helical compression springs 95a. During rotation between these maximum rotational deflection positions A, B, the rollers 75a of the torsion transmission device 78a roll on essentially the circumferential segment, illustrated in FIG. 3, of the internal toothing 83a. Starting from the middle of this circumferential segment, the internal toothing 83a has a tooth pitch which increases toward the ends of the region. During a uniform rotation of the torsion transmission device 78a about its second axis of rotation 65a, which takes place with the output-side flywheel mass arrangement 7 being retained in relation to the first axis of rotation 1, the intermediate flywheel mass arrangement 33 rotates increasingly more rapidly toward the ends of the range of rotation, with the result that the helical compression springs 95a are compressed increasingly more rapidly which produces a progressively increasing restoring force acting between the intermediate flywheel mass arrangement and the output-side flywheel mass arrangement.

The progressively increasing force action is further assisted by a decreasing tooth pitch of the external toothing 79a of the input-side flywheel mass arrangement toward the ends of a corresponding rolling region of the torsion transmission device 78a on the external toothing 79a.

Thus, by an appropriate choice of the tooth pitch and its change, it is possible to set a desired dependence of the restoring spring force of the rotational deflection between the input-side flywheel mass arrangement 5 and the output-side flywheel mass arrangement 33.

Figure 4:
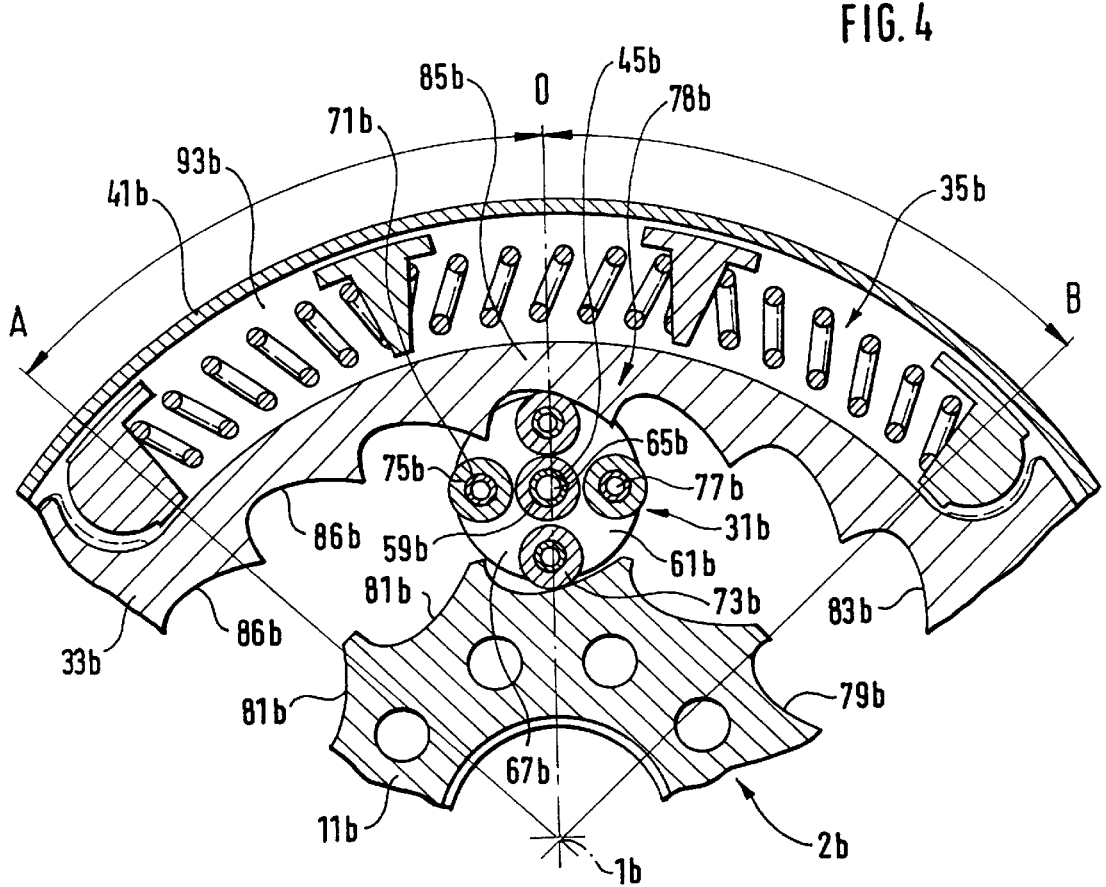
FIG. 4 is a partial axial cross sectional view of yet another embodiment of the torsional vibration damper of FIG. 1.

The torsional vibration damper 2b illustrated in FIG. 4 differs from the torsional vibration damper illustrated in FIGS. 1 and 2 essentially in that the external toothing 79b of the central hub part 11b and the internal toothing 83b of the annular body 86b have tooth flanks which are asymmetric about their tooth tips. For both the external toothing 79b and the internal toothing 83b, the tooth flanks following the tooth tips clockwise have a greater inclination relative to the circumferential direction than the tooth flanks following said tooth tips counterclockwise. This asymmetry causes torque fluctuations acting clockwise to be damped differently from torque fluctuations acting counterclockwise.

The roller gear 31 illustrated in FIG. 1 has a symmetry with respect to a rotation through 90° about the first axis of rotation 1. Particularly good compensation of the radial forces which occur is thereby achieved during operation. Also, in the initial rotary position illustrated, the flywheel mass arrangements 5, 7, 33 do not have any rotational play relative to one another. The three flywheel mass arrangements 5, 7, 33 may be designed to have rotational play relative to one another. This could be reduced, for example, in that, although the torsion transmission devices 78 are arranged at 90° to one another about the first axis of rotation 1, the internal toothing 83 or the external toothing 79 has a different symmetry. When the roller bodies 75 of the individual torsion transmission devices roll 78, they bear respectively on the internal toothing 83 and the external toothing 79 in each case at different moments and therefore also allow quieter running of the roller gear.

In the torsional vibration damper described in the preceding exemplary embodiments, the flywheel mass arrangement provided with the external toothing is used as the input-side flywheel mass arrangement and the flywheel mass arrangement carrying the torsion transmission devices is used as the output-side flywheel mass arrangement. The flywheel mass arrangement may also include the external toothing as the output-side flywheel mass arrangement and, correspondingly, use the flywheel mass arrangement carrying the torsion transmission devices as the input-side flywheel mass arrangement. The flywheel mass arrangement provided with the internal toothing may optionally be used as the input-side or the output-side flywheel mass arrangement and, correspondingly, the flywheel mass arrangement carrying the torsion transmission devices or the flywheel mass arrangement provided with the external toothing may be used as the output-side or input-side flywheel mass arrangement respectively.

It is also possible, furthermore, to deviate from the design of the torsional vibration damper with an external toothing on one of the flywheel mass arrangements and with an internal toothing on another of the flywheel mass arrangements and to provide both flywheel mass arrangements with identical toothings such, for example, as external toothings or internal toothings. The second axis of rotation, about which the torsion transmission devices rotate, may optionally be oriented at an angle to the first axis of rotation.

Furthermore, instead of coupling the output-side flywheel mass arrangement to the intermediate flywheel mass arrangement in a torsionally elastic manner, the spring arrangement may optionally couple the intermediate flywheel mass arrangement is to the input-side flywheel mass arrangement or the output-side flywheel mass arrangement to the input-side flywheel mass arrangement. Furthermore, an additional spring arrangement may be provide to additionally couple the intermediate flywheel mass arrangement to the input-side flywheel mass arrangement in a torsionally elastic manner and/or an additional spring arrangement may be provided which couples the output-side flywheel mass arrangement to the input-side flywheel mass arrangement in a torsionally elastic manner.

The invention is not limited by the embodiments described above which are presented as examples only but can be modified in various ways within the scope of protection defined by the appended patent claims.

I claim:

1. A torsional vibration damper, comprising:
   a first flywheel mass arrangement rotatable about a first axis of rotation;
   a second flywheel mass arrangement rotatable with and relative to said first flywheel mass arrangement about said first axis of rotation;
   a third flywheel mass arrangement rotatable with and relative to said second flywheel mass arrangement and said first flywheel mass arrangement about said first axis of rotation;
   a spring arrangement operatively mounted for torsionally elastically coupling two of said first, second, and third flywheel mass arrangements;
   a gear arrangement coupling said first flywheel mass arrangement to said second flywheel mass arrangement and coupling said second flywheel mass arrangement to said third flywheel mass arrangement;
   said gear arrangement comprising a first toothing arranged along a circumference of said first flywheel arrangement, a second toothing arranged along a circumference of said third flywheel, and a torsion transmission device comprising a roller carrier rotatably mounted on said second flywheel mass arrangement for rotating about a second axis of rotation and a plurality of roller bodies rotatably mounted on said roller carrier for rotating about third axes, said third axes being distributed about said second axis of rotation and equidistant from said second axis of rotation; and
   said plural roller bodies engaging a portion of said first toothing for transmitting torsional forces between said first flywheel arrangement and said second flywheel arrangement and engaging a portion of said second toothing for transmitting torsional forces between said second flywheel arrangement and said third flywheel arrangement.

2. The torsional vibration damper of claim 1, wherein one of said first flywheel mass arrangement and said third flywheel mass arrangement is operatively arranged for having rotational play with respect to the second flywheel mass arrangement.

3. The torsional vibration damper of claim 1, wherein said first and third flywheel mass arrangements are operatively arranged for having substantially no rotational play with respect to said second flywheel mass arrangement.

4. The torsional vibration damper of claim 1, wherein said torsion transmission device comprises a plurality of torsion transmission devices distributed circumferentially about said first axis of rotation.

5. The torsional vibration damper of claim 4, wherein one of said first flywheel mass arrangement and said third flywheel mass arrangement is operatively arranged for having rotational play with respect to the second flywheel mass arrangement; and
   said rotational play is restricted along a first direction of rotation by a bearing of a first of said plurality of torsion transmission devices on one of said first toothing and said second toothing, and is restricted in a second direction of rotation opposite the first direction of rotation by a bearing of a second of the plurality of torsion transmission devices on said one of said first toothing and said second toothing.

6. The torsional vibration damper of claim 4, wherein said plural torsion transmission devices are substantially uniformly distributed about said first axis of rotation.

7. The torsional vibration damper of claim 6, wherein said one of said first toothing and said second toothing is symmetrical with respect to rotation about said first axis of rotation through an angle equal to a multiple of 360° divided by the number of torsion transmission devices.

8. The torsional vibration damper of claim 4, wherein said plural torsion transmission devices comprise an even number of torsion transmission devices positioned in diametrically opposite pairs with respect to said first axis of rotation.

9. The torsional vibration damper of claim 1, wherein successive ones of said plural roller bodies engage in mutually adjacent spacings of said first toothing and said second toothing during rotation of said torsion transmission device about said second axis of rotation.

10. The torsional vibration damper of claim 1, wherein said first toothing comprises a first tooth pitch and said second toothing comprises a second tooth pitch which is different from said first tooth pitch.

11. The torsional vibration damper of claim 1, wherein one of said first toothing and said second toothing comprises an essentially uniform tooth pitch.

12. The torsional vibration damper of claim 1, wherein one of said first toothing and said second toothing comprises a nonuniform tooth pitch.

13. The torsional vibration damper of claim 12, wherein each of said first toothing and said second toothing comprise a region having two ends on which said plural roller bodies of said torsion transmission device roll during rotational deflections between maximum rotational deflection positions of said two of said first, second, and third flywheel mass arrangements, and said at least one of said first toothing and said second toothing having an increasing or decreasing tooth pitch starting from essentially a middle of said region toward said two ends of said region.

14. The torsional vibration damper of claim 1, wherein one of said first toothing and said second toothing has at least one tooth tip with two directly adjacent tooth flanks and said tooth flanks are asymmetrical with respect to an axis running through said tooth tip and said first axis of rotation.

15. The torsional vibration damper of claim 1, wherein said roller carrier comprises sliding bearings on which said plural roller bodies are rotatably mounted.

16. The torsional vibration damper of claim 1, wherein said second flywheel mass comprises a sliding bearing on which said roller carrier is rotatably mounted.

17. The torsional vibration damper of claim 1, wherein said first toothing on the first flywheel mass arrangement comprises an external toothing and said second toothing on said third flywheel mass arrangement comprises an internal toothing.

18. The torsional vibration damper of claim 17, wherein said external toothing and said internal toothing lie in a plane perpendicular to said first axis of rotation and said first axis of rotation is parallel to said second axis of rotation and said third axis of rotation.

19. The torsional vibration damper of claim 17, wherein said second flywheel mass arrangement comprises a U-shaped structure having a U-shaped bend and radially extending legs connected to said U-shaped bend, said U-shaped structure having an open end facing radially inwardly and at least partially surrounding a radially outer portion of said third flywheel mass arrangement, said torsion transmission device being mounted on said legs of said U-shaped structure.

20. The torsional vibration damper of claim 19, wherein said spring arrangement is operatively arranged for torsionally elastically coupling said second flywheel mass arrangement and said third flywheel mass arrangement and said U-shaped structure surrounds a radially outer portion of said spring arrangement.

21. The torsional vibration damper of claim 19, wherein the U-shaped structure defines a radially outwardly sealed off chamber for receiving a lubricant, and one of said spring arrangement, said internal toothing, and said torsion transmission device being arranged in said chamber.

22. The torsional vibration damper of claim 19, wherein said second flywheel mass arrangement comprises an annular disk flywheel having a clutch friction surface, said annular disk flywheel arranged axially adjacent to said U-shaped structure and rotatably fixedly connected to said U-shaped structure, and said torsional vibration damper further comprises a lubricant seal arranged between said leg of said U-shaped structure axially facing said clutch friction surface and said first flywheel mass arrangement.

23. The torsional vibration damper of claim 22, further comprising a rotary bearing rotatably connecting said second flywheel mass arrangement and said first flywheel mass arrangement, wherein the lubricant seal simultaneously seals said rotary bearing.

24. The torsional vibration damper of claim 22, wherein said two legs of said U-shaped structure comprise two sheet metal forms extending substantially radially relative to the first axis of rotation and said annular disk flywheel is fixedly connected to a first one of said two sheet metal forms.

25. The torsional vibration damper of claim 24, wherein a radially outer portion of a second of said two sheet metal forms is bent toward said first sheet metal form and a free end of said radially outer portion is welded at one axial end to said first sheet metal form.

26. The torsional vibration damper of claim 19, wherein said two legs of said U-shaped structure comprise two sheet metal forms extending substantially radially relative to the first axis of rotation.

27. The torsional vibration damper of claim 19, further comprising a first rivet passing through said two legs of said U-shaped structure that is substantially centered relative to said second axis of rotation and a first sliding bearing sleeve surrounding said first rivet and arranged between said two legs, wherein said roller carrier is rotatably mounted on said first sliding bearing.

28. The torsional vibration damper of claim 27, wherein the first sliding bearing sleeve comprises two axial ends which bear against said two legs of said U-shaped structure.

29. The torsional vibration damper of claim 27, wherein said roller carrier comprises a tubular portion having two axial ends mounted on said first sliding bearing sleeve, two disks parts extending radially and parallel to said legs of said U-shaped structure and connected to said axial ends of said tubular portion, a plurality of second rivets passing through said two disk parts, each of said plural second rivets being substantially centered relative to one of said third axes of rotation, and a second sliding bearing sleeve having two axial ends surrounding each of said second rivets between said two disk parts on which said roller bodies are rotatably mounted.

30. The torsional vibration damper of claim 29, wherein said axial ends of said second sliding bearing sleeves bear against said two disk parts.

31. The torsional vibration damper as claimed in one of claims 17, wherein said spring arrangement is operatively arranged for torsionally elastically coupling said second flywheel mass arrangement and said third flywheel mass arrangement.

32. The torsional vibration damper of claim 31, wherein said spring arrangement is circumferentially oriented and comprises a plurality of compression springs, said third flywheel arrangement comprising a recess arranged radially outside said internal toothing for receiving said spring arrangement.

33. The torsional vibration damper of claim 32, further comprising an activating element riveted to one of said two legs of said U-shaped structure for actuating said compression springs.

34. The torsional vibration damper of claim 17, further comprising a sliding element operatively connected for radially guiding said third flywheel mass arrangement relative to said second flywheel mass arrangement.

35. The torsional vibration damper of claim 1, further comprising a rotary bearing rotatably connecting said second flywheel mass arrangement and said first flywheel mass arrangement.

* * * * *